(12) United States Patent
Brothier et al.

(10) Patent No.: US 12,515,894 B2
(45) Date of Patent: Jan. 6, 2026

(54) METHOD AND DEVICE FOR TRANSPORTING POWDERS

(71) Applicant: COMMISSARIAT À L'ÉNERGIE ATOMIQUE ET AUX ÉNERGIES ALTERNATIVES, Paris (FR)

(72) Inventors: Meryl Brothier, Aix-en-Provence (FR); Stéphane Vaudez, Avignon (FR); Anne-Charlotte Robisson, Venelles (FR); King-Wo Li, Orange (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 154 days.

(21) Appl. No.: 18/553,506

(22) PCT Filed: Mar. 30, 2022

(86) PCT No.: PCT/FR2022/050597
§ 371 (c)(1),
(2) Date: Sep. 29, 2023

(87) PCT Pub. No.: WO2022/208023
PCT Pub. Date: Oct. 6, 2022

(65) Prior Publication Data
US 2024/0190669 A1    Jun. 13, 2024

(30) Foreign Application Priority Data

Apr. 2, 2021 (FR) ..................... 2103437

(51) Int. Cl.
*B65G 53/24* (2006.01)
*B65G 53/30* (2006.01)
*B65G 53/52* (2006.01)

(52) U.S. Cl.
CPC ............ *B65G 53/24* (2013.01); *B65G 53/30* (2013.01); *B65G 53/526* (2013.01)

(58) Field of Classification Search
None
See application file for complete search history.

(56) References Cited

U.S. PATENT DOCUMENTS 3,124,442 A * 3/1964 Rich .................. B01F 23/21
62/616
4,428,535 A * 1/1984 Venetucci ............. B02C 19/186
241/35

(Continued)

FOREIGN PATENT DOCUMENTS

EP      0732643 A2    9/1996
FR      3042985 A1    5/2017

(Continued)

OTHER PUBLICATIONS

International Search Report for PCT/FR2022/050597 dated Jul. 11, 2022.
Written Opinion for PCT/FR2022/050597 dated Jul. 11, 2022.

*Primary Examiner* — Joseph A Dillon, Jr.
(74) *Attorney, Agent, or Firm* — McDonald Hopkins LLC (57) ABSTRACT

A method for transporting non-flowable powders includes the following steps: mixing and suspending powders and carbon dioxide in the solid form, with the introduction of a cryogenic fluid, to obtain a cryogenic suspension; setting the cryogenic suspension in motion to enable transport thereof, controlling the motion of the cryogenic suspension according to one or more parameter(s) related to the first mixing and suspending step.

12 Claims, 6 Drawing Sheets

(56) References Cited

U.S. PATENT DOCUMENTS

| | | | | |
|---|---|---|---|---|
| 4,576,015 A | * | 3/1986 | Crawford | F17C 1/00 |
| | | | | 62/50.7 |
| 4,917,834 A | * | 4/1990 | Hadermann | B29B 7/60 |
| | | | | 264/28 |
| 5,368,105 A | * | 11/1994 | Chaiken | A62C 99/0018 |
| | | | | 169/44 |
| 6,085,939 A | * | 7/2000 | Geweke | B65G 53/66 |
| | | | | 222/61 |
| 6,276,143 B1 | * | 8/2001 | Wimberley | F17C 7/02 |
| | | | | 62/50.2 |
| 9,396,854 B2 | * | 7/2016 | Geers | H01F 27/2895 |
| 10,688,459 B2 | * | 6/2020 | Brothier | B01F 23/806 |
| 10,981,126 B2 | * | 4/2021 | Brothier | B01F 23/69 |
| 11,260,397 B2 | * | 3/2022 | Brothier | B01J 2/10 |
| 12,102,999 B2 | * | 10/2024 | Laurent | B01L 3/502715 |
| 2018/0318778 A1 | | 11/2018 | Atomique | |
| 2018/0318779 A1 | * | 11/2018 | Brothier | B01F 23/66 |
| 2022/0219918 A1 | * | 7/2022 | Ellis | B65G 53/526 |

FOREIGN PATENT DOCUMENTS

| | | |
|---|---|---|
| JP | S62121131 A | 6/1987 |
| JP | H02249999 A | 10/1990 |

\* cited by examiner

METHOD AND DEVICE FOR TRANSPORTING POWDERS

CROSS-REFERENCE TO RELATED APPLICATIONS

This is the National Stage application of PCT international application PCT/FR2022/050597, filed on Mar. 30, 2022, which claims the priority of French Patent Application No. 2103437, filed Apr. 2, 2021, both of which are incorporated herein by reference in their entireties.

TECHNICAL FIELD

The invention relates to the field of powder transportation, and particularly the field of non-flowable powders which may be of any known type. For example, without limitation, the powders may be high-density and/or cohesive ones.

The invention is applicable for any industrial process using powders, particularly non-flowable powders. It refers to a method for transporting powders and an associated device.

PRIOR ART

Conventionally, different ways allow ensuring the powder transportation function, described hereinafter according to four concepts.

First of all, the vibrating plane or corridor systems are made up of plane or pipe sections subjected to vibratory movements inducing an overall component directed in the direction of the desired movement. For example, this type of solution is described in the article entitled "Modelisation du comportement dynamique d'un plancher vibrant: interaction avec le milieu granulaire", Benoit GELY, Thesis with Sigma Clermont Auvergne University, September 2017. These systems also have several drawbacks. They could induce strong dispersions of powders and segregation. In addition, they are barely suited to the positive large change in elevation.

Furthermore, pneumatic transport systems are composed of sealed ducts placed under a partial vacuum, or more rarely under overpressure, to allow driving, by pressure difference inducing an air direction circulation, towards the conveying point of the powder. For example, this type of solution is described in the article entitled "Manutention pneumatique de produits en vrac", Thierry DESTOOP, Techniques de l'ingénieur, Reference AG7510 v2, Oct. 10, 2013. Nevertheless, these systems have several drawbacks. On the one hand, they are effective only for powders with a minimum flowability. On the other hand, they are effective only for low apparent particle sizes and/or densities. Impacts at piping elbows might cause a change in the granular medium. In addition, they could lead to a risk of clogging and require filtering the vents.

Next, mechanical conveying systems are composed of movable bodies most often subjected to rotational movements to push the granular medium at each periodic movement. These typically consist of worm screws or Archimedean screws. Belt, or else bucket, systems are also possible. For example, this type of solution is described in the article entitled "Manutention mécanique continue de produit en vrac", Claude SAUDEMONT, Techniques de l'ingenieur, Reference AG7511 v1, Jul. 10, 2002. These systems also have several drawbacks. They could modify the granular medium by local compaction of the powder. They could induce a segregation. They operate on straight sections. Furthermore, in the case of belt or bucket conveyors, the problem is the material dispersion and the absence of control over the accurate amount of material supplied.

Finally, dredging systems are suspension pumping systems, most often aqueous, enabling the transport of the granular medium by means of a suction pump. These systems also have drawbacks. Indeed, they could induce strong liquid entrainment in comparison with the granular medium to be transferred. In addition, the transport of powders is impossible in the case of powders that are soluble or sensitive to the liquid used. They could also lead to a segregation of the granular medium.

Hence, it appears that the four types of suggested solutions hereinabove to address the problem of powder transportation are not fully, and even not all, satisfactory for the transport of non-flowable powders.

Specifically, there is still a need to ensure the function of transport, or transfer, of a non-flowable granular medium with particularly the following requirements: quickly, continuously, accurately in terms of dispensed flow rate, safe with no dispersion that might create explosive atmospheres, and energy efficient; without inducing segregation of the granular medium to be transported; without being limited by the topology of the pathway to be followed (ascent, descent, any direction change, etc.); without compaction of the granular medium; without any risk of dispersion of fine particles constituting the granular medium to be transported.

DISCLOSURE

The invention aims to address at least partially the aforementioned needs and to overcome the drawbacks related to the embodiments of the prior art.

The invention specifically aims to be able to convey the granular medium as if it were liquid but without then having to separate the powder from the fluid carrier in a costly and/or time-consuming manner. It also aims not to induce any effluents that are difficult to treat, as well as not to induce pollution of the granular medium and to allow conveying all types of powders, and primarily those that cannot be poured, with a particle size ranging from a few nanometres to a few centimetres and variable densities with no constraint, namely powders ranging from very sparse to very dense.

An object of the invention, according to one of its aspects, is a method for transporting non-flowable powders, characterised in that it includes the following steps:

a) mixing and suspending powders and carbon dioxide in the solid form, with the introduction of a cryogenic fluid, to obtain a cryogenic suspension, the volumetric mass proportions of the powders and of the carbon dioxide meeting the following equation (i):

$$40\% < [\text{powders}]_{vol} + [CO_2(s)]_{vol} < 80\%, \qquad (i):$$

where:
   [powders]$_{vol}$ is the volumetric mass proportion of the powders,
   $[CO_2(s)]_{vol}$ is the volumetric mass proportion of carbon dioxide in the solid form,
   b) setting the cryogenic suspension in motion to enable transport thereof,
   c) controlling the motion of the cryogenic suspension according to one or more parameter(s) related to the mixing and suspension step a).

The method according to the invention may further comprise one or more of the following features considered separately or according to any possible technical combination.

The method according to the invention is preferably suited for powders qualified as "non-flowable". The "flowability" concept corresponds to the property of a granular medium to flow naturally. It may be characterised by several methods. One of which may be derived from a Carr index type measurement. By definition, this index is determined as the ratio between the difference between the apparent volume occupied by a given amount of powders and the packed volume of the same amount of powders, all based on the apparent volume. Beyond a Carr index of 25, the granular medium is conventionally considered to be barely flowable. Below a Carr index of 15, the granular medium is considered to be relatively quite flowable. Thus, in the context of the invention, by non-flowable powders, it should be understood powders whose Carr index is strictly higher than 15, and preferably higher than or equal to 25.

Furthermore, the conditions of the equation (i) of step a) of mixing and setting in motion advantageously allows obtaining a stable and pumpable cryogenic suspension. Also, advantageously, the cryogenic suspension is stable and pumpable.

It should be noted that by "stable", it should be understood that a suspension is considered stable when the time required for the complete settling of the suspension is at least ten times longer than the time of the operation of transport, or transfer, thereof. Typically, in the context of the invention, the duration of transport, or transfer, of powders may be in the range of a few minutes whereas the stability duration may be in the range of one hour.

Advantageously, the presence of carbon dioxide in the solid form in the cryogenic suspension may serving as a steric stabiliser of the powders in order to prevent sedimentation thereof.

It should also be noted that by "pumpable", it should be understood the ability of a formulation to be implemented by means of a conventional pumping system, such as a piston or rotor type pump. Nonetheless, it should be noted that a suspension qualified as "pumpable" is not necessarily intended to be pumped but is capable of being so where necessary. For example, this "pumpable" concept appears in the presentation entitled "Formulation, homogénéité et pompabilité", François DE LARRARD, BetonlabPro 3, Lesson No. 13, Laboratoire Central des Ponts et Chaussées—Nantes Centre (LCPC). More intrinsically, a suspension is considered to be "pumpable" to the extent that the driving force accessible by conventional pumping systems (in particular a piston or rotor type pump) to enable movement thereof in a given circuit is higher than the braking force induced by the viscosity of the suspension. Conventionally, a suspension having a viscosity in the range of 100,000 mPa·s is considered to be non-pumpable. A suspension having a viscosity lower than 20,000 mPa·s is considered to be pumpable.

Advantageously, the cryogenic fluid is a gas liquefied at room temperature and pressure. In particular, it may be liquid nitrogen ($N_2$). Nonetheless, this choice is not restrictive. The cryogenic fluid allows defining the fluidic, in particular liquid, behaviour of the cryogenic suspension and allows keeping the carbon dioxide ($CO_2$) in the solid form.

In addition, solid carbon dioxide, also called dry ice, may be in the form of granules and/or powders. By its size or occupancy rate in the cryogenic suspension, this dry ice allows stabilising the powders to be transported.

The method may comprise step a') of weighing the powders to be transported and step a") of weighing carbon dioxide in the solid form, steps a') and a") being prior to the mixing and suspension step a).

Moreover, step b) of setting the cryogenic suspension in motion may comprise depressurising, pumping or pressurising the cryogenic suspension.

Step c) of controlling the motion of the cryogenic suspension may comprise step c') of acquisition and processing the measurement of the stirring torque of the cryogenic suspension.

Furthermore, step c) of controlling the motion of the cryogenic suspension may comprise step c") of measuring the pressure and/or opening of the pump performed during step b) of setting the cryogenic suspension in motion.

Also, step b) of setting the cryogenic suspension in motion may be followed by a transport step d), in particular followed by a phase separation step e) for obtaining transported powders and the implementation of a step f) for recycling the cryogenic fluid.

Furthermore, the average diameter of the particle size of the carbon dioxide in the solid form may be comprised between 0.1 and 10 times that of the particle size of the powders to be transported.

It should be noted that the concept of "average diameter" of a granular medium is used to the extent that the considered granular medium is not formed by solid particles all having the same size and not generally strictly spherical. In this case, the particle size is a size, surface area, or equivalent volume distribution. With this static distribution, it is possible to associate a concept of average dimension also called "average diameter". For example, such a concept is described in the article "Caractérisation de la taille des particules", John DODDS, Gerard BALUAIS, Sciences Géologiques, bulletins et mémoires, 46-1-4 pages 79-104, 1993.

The charge level of carbon dioxide in the solid form may be comprised between 0.1 and 10 times that of the powders to be transported.

Moreover, the viscosity of the cryogenic suspension according to the charge level and the particle size of the constituent solid of this cryogenic suspension may be expressed by the following equation (ii):

$$\mu/\mu_0 = (1 + \tfrac{1}{2} \cdot [N] \cdot \Phi / (1 - \Phi/\Phi_m)^2, \qquad \text{(ii)}$$

where:
$\mu$ is the viscosity of the cryogenic suspension;
$\mu_0$ is the viscosity of the liquid phase;
$[N]$ is a constant;
$\Phi$ is the volume of solid in the volume of the cryogenic suspension;
$\Phi_m$ is the maximum volume of solid in the volume of the cryogenic suspension.

Another object of the invention, according to another one of its aspects, is a device for transporting non-flowable powders, for implementing the method as defined before, characterised in that it includes:
  a system for mixing and suspending powders, carbon dioxide in the solid form and a cryogenic fluid to form the cryogenic suspension,
  a system for setting the cryogenic suspension in motion,
  a system for controlling the motion of the cryogenic suspension.

The mixing and suspension system may comprise:
  a mixing tank,
  a mixing and blending device, located inside the mixing tank,
  means for the controlled introduction of the powders to be transported and of the carbon dioxide in the solid form into the mixing tank, a means for measuring the level of the formed cryogenic suspension, located at least partially inside the mixing tank.

In addition, the system for setting the cryogenic suspension in motion may comprise a pressure difference transport device.

Furthermore, the pressure difference transport device may comprise means for pressurising, pumping or depressurising the cryogenic suspension.

DESCRIPTION OF THE FIGURES

The invention could be better understood from the detailed description of non-limiting examples of implementation and upon examining the schematic and partial figures, wherein:

FIG. 2 shows a block diagram illustrating an example of a method for transporting non-flowable powders in accordance with the invention, FIGS. 3 to 5 schematically illustrate three distinct examples of devices for transporting non-flowable powders in accordance with the invention, FIG. 6 graphically illustrates the evolution of the stirring torque of the cryogenic suspension as a function of the stirring time and according to three solid charge introductions, and FIGS. 7, 8 and 9 respectively show the evolution of the viscosity as a function of the shear rate for suspensions of alumina and dry ice in liquid nitrogen, the evolution of the viscosity as a function of the shear rate for different concentrations of dry ice suspensions in liquid nitrogen, and the evolution of the volume as a function of the size of the particles of alumina powder that could be used to make the cryogenic suspension.

In these figures, identical references may refer to identical or similar elements.

Furthermore, the different portions shown in the figures are not necessarily plotted according to a uniform scale, to make the figures more readable.

DISCLOSURE OF THE EMBODIMENTS

The cryogenic fluid FC is herein considered to be liquefied nitrogen ($N_2$) but this choice is not restrictive.

Figure 1:
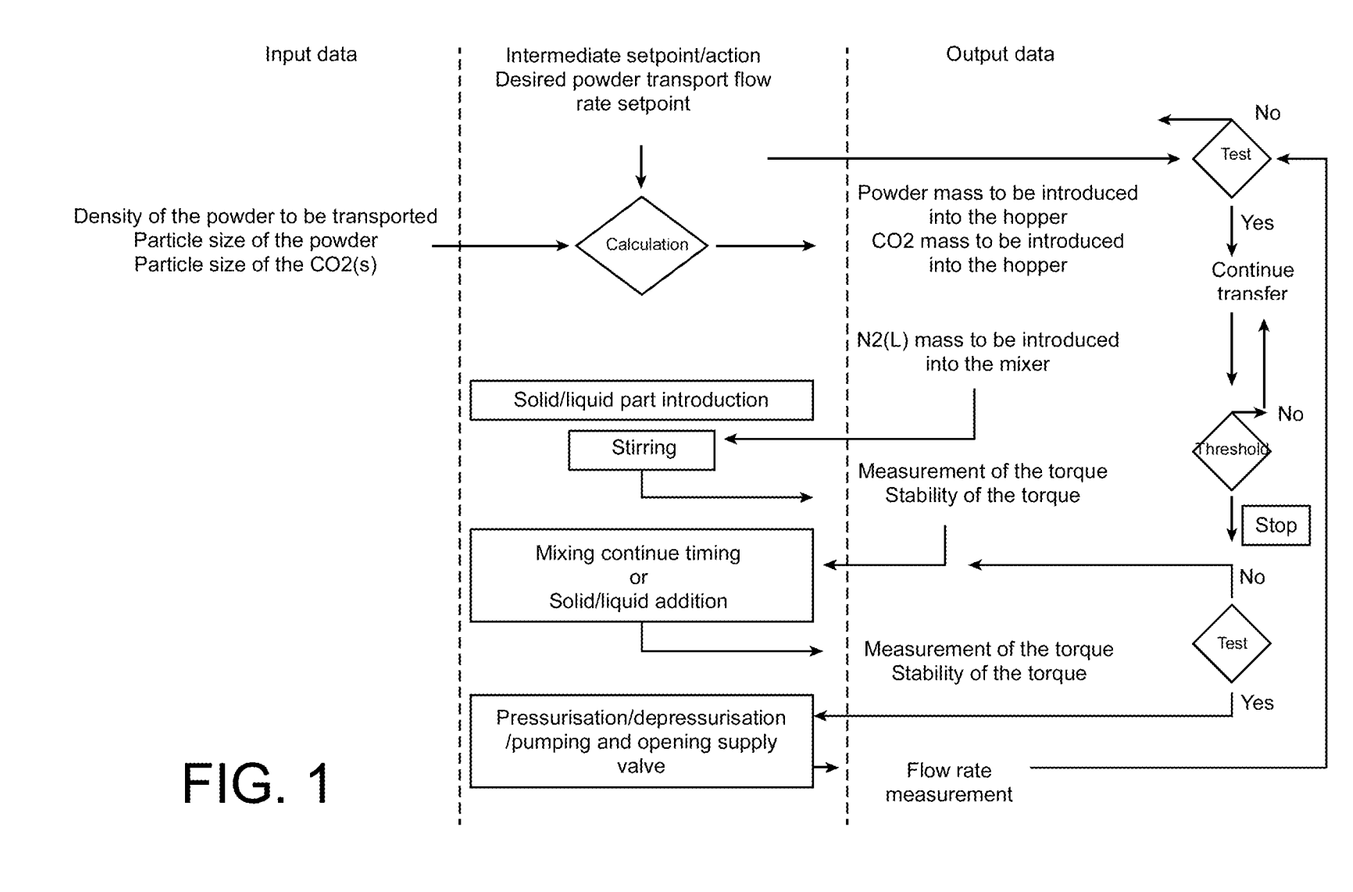
FIG. 1 shows a simplified flowchart of the control of a method in accordance with the invention.

FIG. 1 is a simplified flowchart of the control necessary for the proper completion of a method in accordance with the invention. It allows specifying the sequence of the measurements and of the input and output data necessary for the control.

Figure 2:
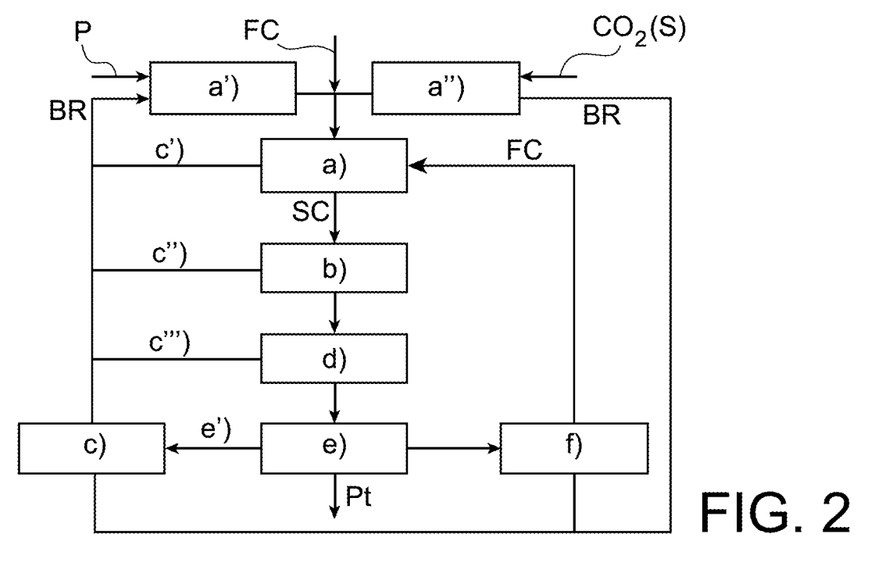

A block diagram is shown in FIG. 2 illustrating an example of a method for transporting non-flowable powders P in accordance with the invention.

Thus, this method includes a step a') of weighing the powders P to be transported and a step a") of weighing the carbon dioxide in the solid form $CO_2(s)$. The references BR refer to feedback loops.

Then, the method includes a step a) of mixing and suspending the powders P and the carbon dioxide in the solid form $CO_2(s)$, with the introduction of the cryogenic fluid FC, to obtain the cryogenic suspension SC.

Once the cryogenic suspension SC has been formed, a step b) of setting the cryogenic suspension SC in motion to enable transport thereof is implemented, either by depressurising, or by pumping, or by pressurising the cryogenic suspension SC.

Then, a step d) enables the transport or transfer of the suspension before a phase separation step e) allowing obtaining the transported or transferred powders Pt. A liquid nitrogen recycling may be provided for during a step f).

During the transport method, a step c) of controlling the motion of the cryogenic suspension SC is implemented. Thus, a step c') of acquiring and processing the measurement of the stirring torque Co of the cryogenic suspension SC allows optimising mixing of the suspension.

In addition, a step c") of measuring pump pressure and/or opening is performed during step b) of setting in motion. A step c''') also allows measuring the flow rate during the transport step d) and a step e') allows measuring the temperature during the phase separation step e).

Figure 3:
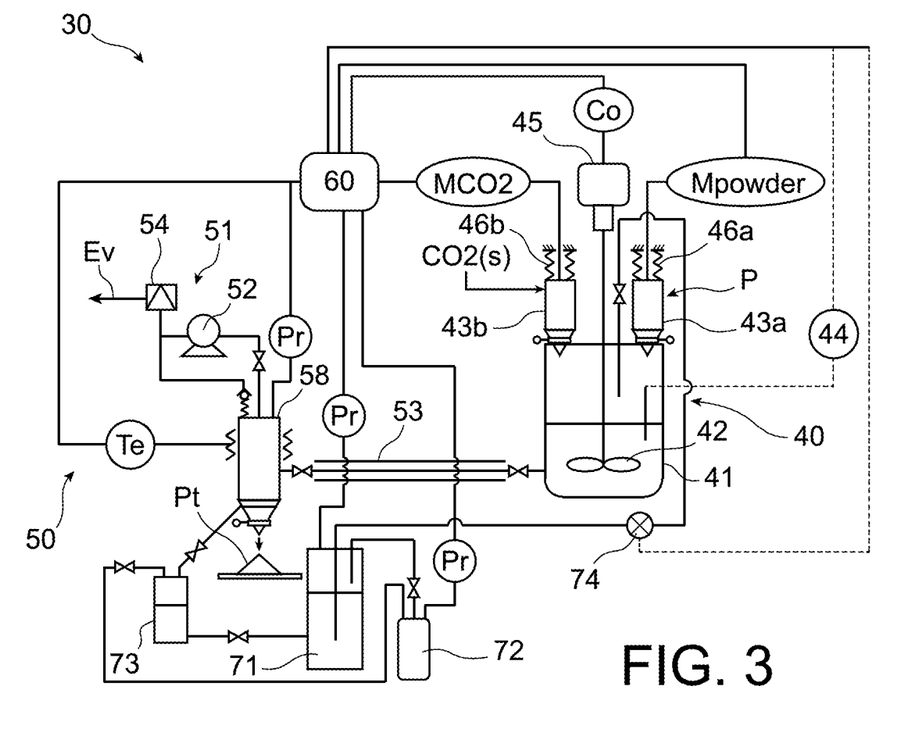
Figure 4:
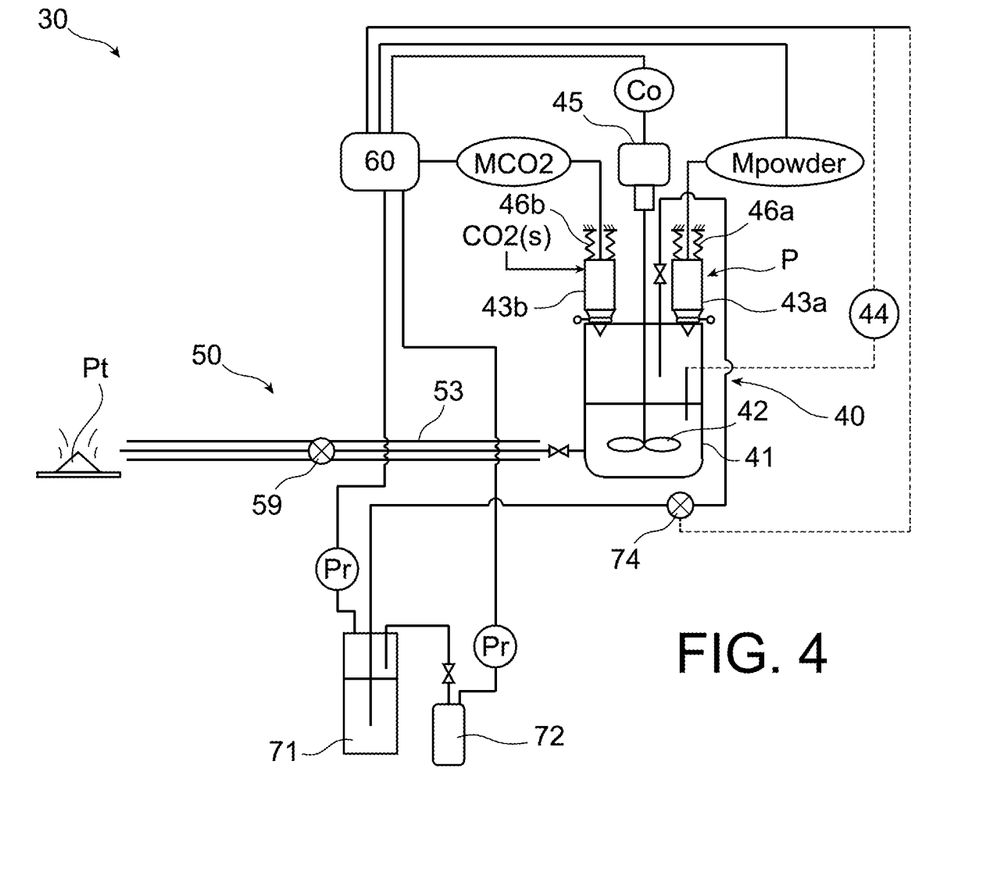
Figure 5:
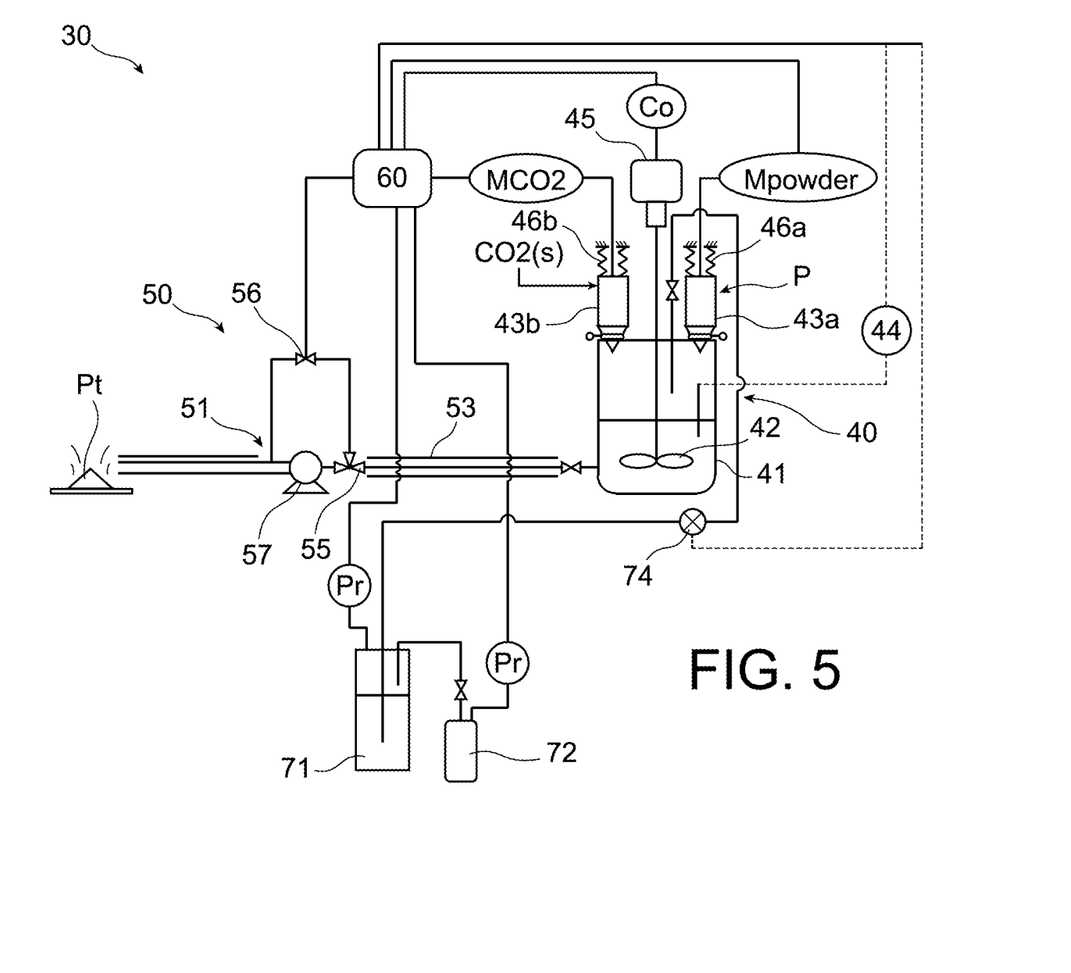

Furthermore, FIGS. 3 to 5 allow illustrating three examples of devices 30 for transporting non-flowable powders P in accordance with the invention.

In these three embodiments, each device 30 primarily includes a system 40 for mixing and suspending the powders P, the carbon dioxide in the solid form $CO_2(s)$ and the cryogenic fluid FC to form the cryogenic suspension SC.

In particular, the mixing and suspension system 40 may include at least part of the elements of the devices described in the French patent applications FR 3 042 985 A1 and FR 3 042 986 A1.

This system 40 comprises a mixing tank 41. The mixing tank 41 is heat-insulated, thermally insulated, to allow keeping the liquefied gas in the form of liquid nitrogen without excessive volatisation. Ideally, heat losses would be in the range of 2% per day and even less.

Furthermore, the system 40 comprises a mixing and blending device 42, located inside the mixing tank 41. In particular, this mixing and blending device 42 may be a stirrer, for example of the blade, propeller, turbine, anchor, attritor type or other, selected in particular according to the viscosity of the considered cryogenic suspension SC. The mixing and blending device 42 is driven in rotation to generate stirring by means of a drive motor 45. This motor 45 embeds a means for measuring the torque Co of the cryogenic suspension SC in order to identify whether the suspension is homogeneous and the charge level suitable.

The system 40 also comprises means 43a, 43b for the controlled introduction of the powders P to be transported and of carbon dioxide in the solid form $CO_2(s)$ into the mixing tank 41. In particular, it consists of a first supply hopper 43a for the introduction of the powders P to be transported and a second supply hopper 43b for the introduction of carbon dioxide in the solid form $CO_2(s)$. The controlled introduction is done by weighing or dosing. To do so, the supply hoppers 43a, 43b are used respectively in connection with weighing systems 46a, 46b corresponding to suspended scales or spring scales. Thus, it is possible to monitor the introduced mass over time.

Depending on the specificity of the granular medium to be transported, namely the cryogenic suspension, in particular according to its particle size and its density, the proportions of powders P, carbon dioxide in the solid form $CO_2(s)$ and liquid nitrogen my vary. Nonetheless, in order to obtain a cryogenic suspension SC which is stable and pumpable with regards to the meaning of the definitions given before, the volumetric mass proportions of the powders P and of the carbon dioxide $CO_2(s)$ meet the following equation (i):

$$40\% < [\text{powders}]_{vol} + [CO_2(s)]_{vol} < 80\%, \qquad (i)$$

where:

[powders]$_{vol}$ is the volumetric mass proportion of the powders P, $[CO_2(s)]_{vol}$ is the volumetric mass proportion of carbon dioxide in the solid form $CO_2(s)$.

To obtain a cryogenic suspension SC that is pumpable and stable with regards to the meaning of the invention, the major parameters to be determined and/or monitored are:

the charge level of the powders P, namely the volume of solid with respect to the total volume of the suspension SC: one would advantageously seek to increase this level to the highest possible value to optimise the amount of powders P transported for a given moved volume of cryogenic suspension SC;

the charge level of carbon dioxide in the solid form $CO_2(s)$: this level conventionally depends on the amount of powders P to be introduced into the cryogenic suspension SC;

the density of the powders P to be transported: in general, the denser the powders P and the larger the particle size, the more one would seek to make viscous suspensions incorporating large amounts of carbon dioxide $CO_2(s)$ to limit the risks of settling of the powders P to be transported within the cryogenic suspension SC;

the particle size of the carbon dioxide in the solid form $CO_2(s)$, given in particular by the average diameter of the particle size distribution of the carbon dioxide available to formulate the cryogenic suspension SC;

the particle size of the powders P given in particular by the average diameter of the particle size distribution of the granular medium to be transported.

Also, advantageously:

the particle size of the carbon dioxide in the solid form $CO_2(s)$ is related to that of the powders P to be transported: more specifically, it is substantially of the same order of magnitude, the average diameter being between about 0.1 and 10 times the particle size of the powders P to be transported;

the carbon dioxide charge level in the solid form $CO_2(s)$ is related to that of the powders P to be transported: more specifically, it is substantially of the same order magnitude, the value being between about 0.1 and 10 times the content of powders to be transported;

the liquid nitrogen content is as limited as possible: it is advantageously lower than 70% by volume; this liquid nitrogen content should nevertheless allow making the suspension flowable and cannot be lower than 5% by volume;

the particle size of the solid phase, comprising the powders P to be transported and the carbon dioxide in the solid form $CO_2(s)$, is lower than 10 times the diameter of the transport piping, otherwise segregations might occur and cause a loss of the integrity of the granular medium to be transported.

Advantageously, these requirements may allow optimising the transport of the powders P for a given volume of cryogenic suspension SC while guaranteeing the implementation of the suspension by pumping, pressurisation or depressurisation. Thus, this could result in a limited viscosity, in the range of 100,000 mPa·s, and the suspension formulation suited to the transport piping.

Advantageously, the particle size of the dry ice may be comprised between 500 and 900 μm.

Finally, the system 40 comprises a means 44 for measuring the level of the formed cryogenic suspension SC, located at least partially inside the mixing tank 41. More particularly, this measuring means 44 may be in the form of a bubble stick or an ultrasonic probe.

The system 50 for setting the cryogenic suspension SC in motion also allows conveying the latter towards the expected arrival point. This system 50 comprises a pressure difference transport device 51.

For each embodiment of FIGS. 3 to 5, the pressure difference transport device 51 is different. These may consist of means for pressurising, pumping or depressurising the cryogenic suspension SC.

In FIG. 3, the pressure difference transport device 51 corresponds to a depressurisation avoiding the use of a cryogenic pump. In this FIG. 3, the reference Te denotes temperature.

Thus, it includes a depressurisation pump 52. It consists of a vacuum pump for depressurising a transport tank 58 in which the cryogenic suspension SC should be collected. This suspension transportation mode allows avoiding the need for of a cryogenic circulation pump, potentially complex and expensive and unable to convey objects whose average particle size would be larger than a few millimetres. Moreover, this configuration enables the liquid nitrogen recirculation.

The transfer of the cryogenic suspension SC towards the transport tank 58 is done by means of a heat-insulated pipe 53 which enables the transport of the formulated suspension while limiting heat losses up to the transport arrival point.

The transport tank 58 is similar to a degasifier. This consists of an enclosure equipped with a thermostatically-controlled heating system and a valve and pressure control system, symbolised by the reference Pr in FIG. 3.

Furthermore, at the outlet of the pump 52, a media filter 54 suited to the particle size of the granular medium to be transported is present, upstream of the vents Ev. For example, this filter 54 may be a paper/fibreglass or ceramic candle filter.

In this FIG. 3, like for FIGS. 4 and 5 described later on, an insulated first tank 71 for supplying liquid nitrogen and a second tank 72 for supplying nitrogen in the form of compressed gas are present. Similarly, for the three embodiments of FIGS. 3, 4, and 5, a mass flowmeter 74 is present at the mixing tank 41, for example of the Coriolis effect or ultrasonic type.

Finally, a recycling can 73 is provided for which forms a buffer tank intended for liquid nitrogen recirculation.

FIG. 4 shows a pressure difference transport device 51 which corresponds to pressurisation of the mixing tank 41 containing the cryogenic suspension SC. Also, in this example, the mixing tank 41 comprises pressure measuring means MP.

In this configuration, another mass flowmeter 59, for example of the Coriolis effect or ultrasonic type, is used. In addition, a valve 75 for supplying nitrogen in the form of gas is provided for the pressurisation.

FIG. 5 shows an example wherein the pressure difference transport device 51 corresponds to pumping by a circulation pump 57 for drawing the cryogenic suspension SC.

The circulation pump 57 is a suction pump. For example, it may be a piston or a rotor (peristaltic) type one, in particular with a flexible junction of the polytetrafluoroethylene (PTFE) type. The pump 57 is then cryogenic and made up of internals allowing mechanically withstanding the temperature of the suspension, generally close to −196° C., and enabling the transfer of the solid material forming the suspension. The particle size of the cryogenic suspension SC cannot then conventionally be larger than a few millimetres.

A three-way valve 55, intended for adjusting the opening of the bypass loop, and another valve 56, intended for opening and closing the bypass, are also present in this configuration of the transport device 51.

Moreover, a system 60 for controlling the motion of the cryogenic suspension SC is provided. In particular, this control system 60 enables the motion of the cryogenic suspension SC according to at least one parameter related to the mixing and suspension system 40, in particular the torque Co. The control system 60 allows compiling all of the measurements made on the device 30 for transporting the powders P, and enables the control actions or feedbacks on the controllable members, such as valves, pump, stirring motor, etc.

Thus, the control system 60 integrates the acquisition and processing of several data:

- the measurement of the amount of materials of the dry ice MCO2 and of the powders Mpowder, as well as of the cryogenic fluid FC, so as to assess the volume and/or mass contents of the constituents of the cryogenic suspension SC;
- the measurement of the level of the mixing tank 41 to avoid clogging thereof and to assess the volumetric mass of the formed cryogenic suspension SC;
- the measurement of the stirring torque Co allowing assessing the viscosity of the cryogenic suspension SC and allowing verifying that the latter is homogeneous and stirred enough.

Figure 6:
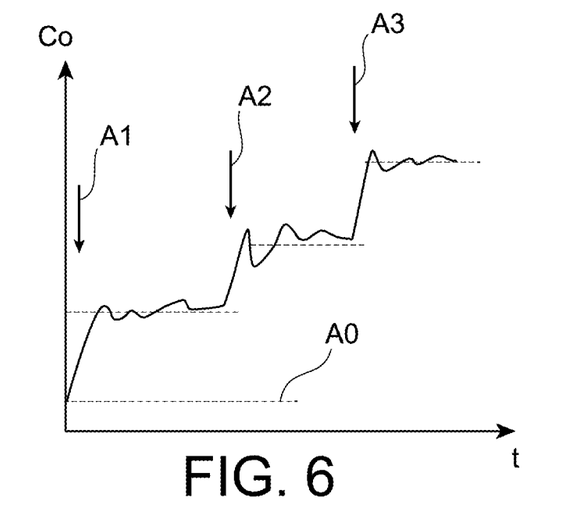

As regards the stirring torque parameter Co, FIG. 6 graphically shows the value of the stirring torque Co as a function of time t. The references A0, A1, A2 and A3 respectively correspond to the unloaded torque, to a first addition of a solid load, to a second addition of a solid load and to a third addition of a solid load. Thus, with each introduction of material A1, A2 and A3, the torque Co increases for a given stirring speed. Nonetheless, after a given stirring duration, the torque Co tends to stabilise as shown by the levels in FIG. 6. This then enables the possible introduction of an additional amount of powders P into the cryogenic suspension SC, for example, if the transport flow rate setpoint requires so.

Depending on the configuration used for the system 50 for setting the cryogenic suspension SC in motion, namely those described in the three embodiments of FIGS. 3, 4 and 5, the control system 60 also integrates the acquisition and processing of the data described hereinafter.

In the case of a configuration of the type described with reference to FIG. 3, namely a transport by pressurised transport tank 58, the control system 60 enables the measurement of the pressure in the transport tank 58 and measuring the temperature opposite the transport tank 58 to monitor the volatisation of the liquefied gas except in the case of recycling of this liquefied gas. The separation may be done by mere density difference and drawing with regards to the fact that the liquid nitrogen has a density generally lower than the granular medium to be transported, in the range of 0.8.

In the case of a configuration of the type described with reference to FIG. 4, namely with pressurisation of the mixing tank 41 containing the cryogenic suspension SC, the control system 60 enables the pressure measurement to adjust the transport flow rate of the suspension measured by a mass flowmeter, for example of the Coriolis effect or ultrasonic type.

In the case of a configuration of the type described with reference to FIG. 5, namely that by circulation pump 57 for drawing the cryogenic suspension SC, the control system 60 enables the measurement of the opening of the valves 55 and 56 to allow adjusting the flow rate of drawing the cryogenic suspension SC.

Figure 7:
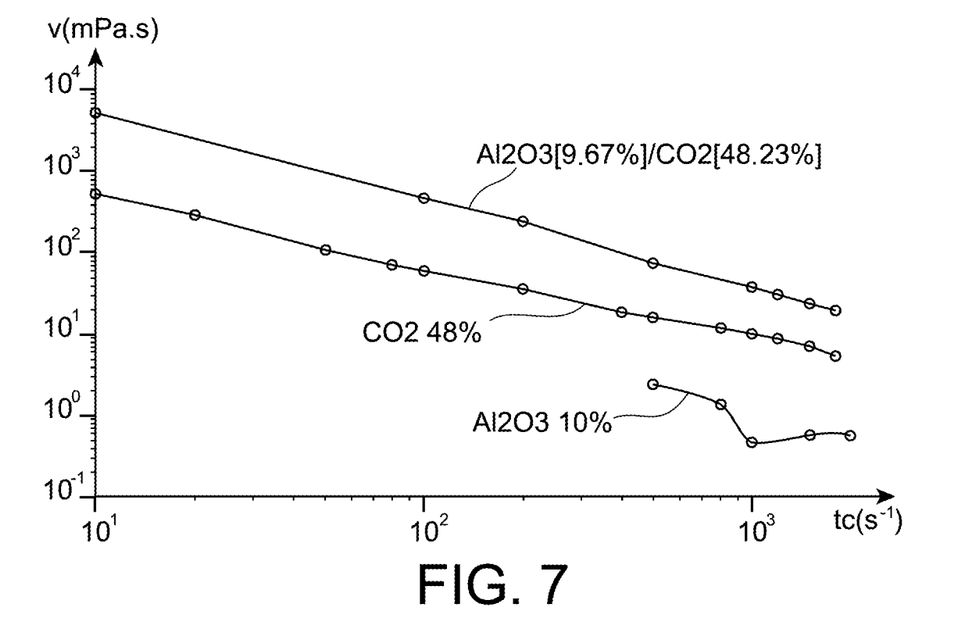
Figure 8:
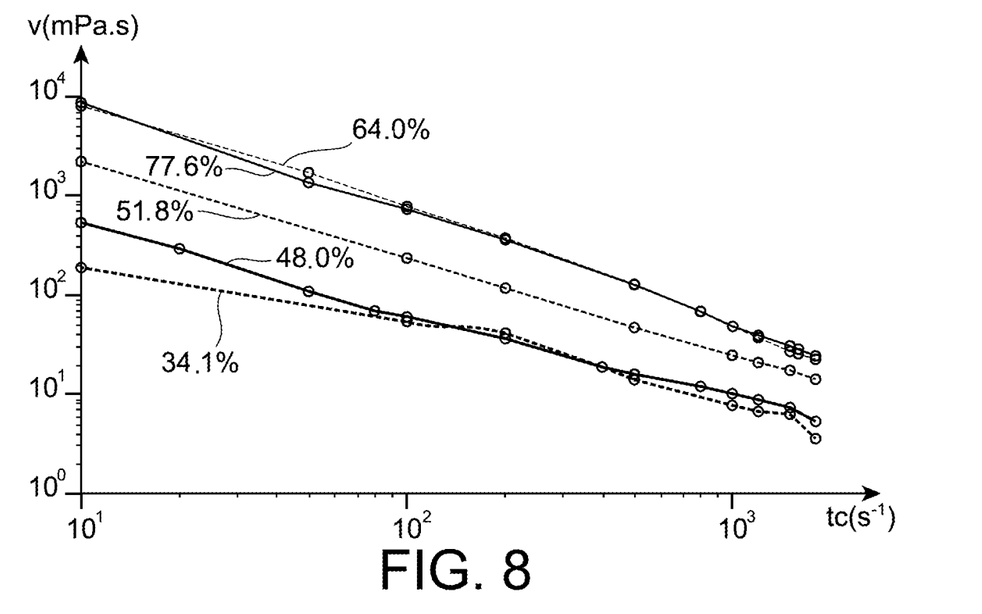
Figure 9:
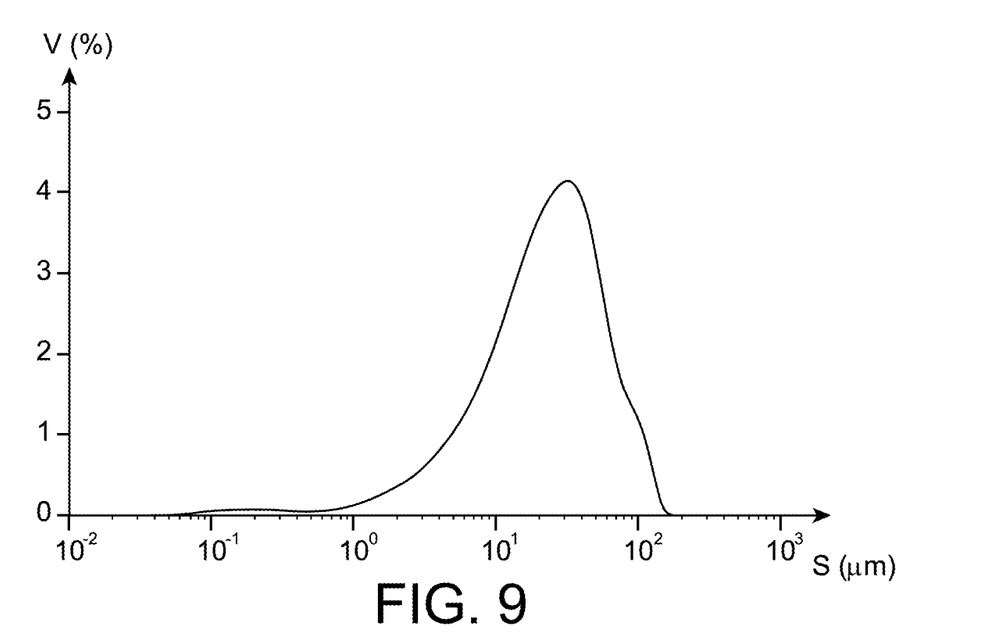

Referring to FIGS. 7 and 8, the rheological behaviour of several cryogenic suspensions SC that could be considered in the context of the invention is described. In addition, FIG. 9 illustrates the particle size distribution of the alumina powder used for these SC cryogenic suspensions.

Advantageously, the particle size of the used dry ice is derived from a particle size cut performed by sieving between 500 and 900 μm.

Specifically, FIG. 7 shows the evolution of the viscosity v, expressed in mPa·s, as a function of the shear rate tc, expressed in $s^{-1}$, for suspensions of alumina ($Al_2O_3$), dry ice in liquid nitrogen.

FIG. 8 shows the evolution of the viscosity v, expressed in mPa·s, as a function of the shear rate te, expressed in s1, for different concentrations of suspensions of dry ice in liquid nitrogen.

Thus, FIGS. 7 and 8 allow illustrating the viscosities of the cryogenic suspensions and showing the influence of the dry ice content on the viscosity of the fluid to be transferred. FIG. 9 shows the evolution of the volume V, expressed in %, as a function of the size S, expressed in μm, of the alumina powder particles which could be used to make the cryogenic suspension SC.

In general, the rheological behaviour of the cryogenic suspensions SC may be approximated by semi-empirical laws. For example, an expression of the suspension viscosity as a function of the charge level and the particle size of the solid forming this suspension may be given hereinafter by the equation (ii):

$$\mu/\mu_0 = (1 + \tfrac{1}{2} \cdot [N] \cdot \Phi/(1 - \Phi/\Phi_m)^2, \qquad \text{(ii)}$$

where:

μ is the viscosity of the suspension;

$\mu_0$ is the viscosity of the liquid phase;

[N] is a constant;

Φ is the volume of solid in the volume of the suspension;

$\Phi_m$ is the maximum volume of solid in the volume of the suspension.

Knowing the viscosity of the suspensions, it is then possible to deduce the possible transport flow rate Qy according to the pumping performance of the implemented system, given by the pressure difference between the upstream and downstream of the pumping system denoted ΔP. Thus, it is possible to obtain the equation (iii) given hereinafter:

$$\Delta P = (8 \cdot \mu \cdot L) \cdot Qv/(\pi \cdot R^4), \qquad \text{(iii)}$$

where:

ΔP is the pressure difference between the upstream and downstream of the pumping system;

μ is the viscosity of the suspension;

Qv is the volume flow rate;

R is the radius of the fluid transport duct;

L is the length of the transmission duct.

It is possible to estimate hereinafter, in the case of some suspensions formulated for the invention, the performance of the driving force system to be implemented to induce an efficient transport of alumina powders as illustrated by the FIG. 9. The following table A gives some obtained values.

TABLE A

| Formulations $N_{2liquid}/CO_2(s)/Al_2O_3$ (in % by volume) | Transported suspension volumetric flow rate | Transport piping diameter | Transported powder mass flow rate | Driving pressure difference to ensure the targeted flow rate |
|---|---|---|---|---|
| 22% $N_{2liquid}$/68% $CO_2(s)$/10% $Al_2O_3$ | 1 m³/h | 4 cm | 87 kg/h | 0.31 bar |
| 42% $N_{2liquid}$/48% $CO_2(s)$/10% $Al_2O_3$ | 1 m³/h | 4 cm | 87 kg/h | 0.18 bar |

Of course, the invention is not limited to the embodiments that have just been described. Various modifications can be made thereto by a person skilled in the art.

What is claimed is:

1. A method for transporting non-flowable powders, wherein it includes the following steps:
   a) mixing and suspending powders and carbon dioxide in the solid form ($CO_2(s)$), with the introduction of a cryogenic fluid, to obtain a cryogenic suspension, the volumetric mass proportions of the powders and of the carbon dioxide ($CO_2(s)$) meeting the following equation (i):

$$40\% \leq [\text{powders}]_{vol} + [CO_2(s)]_{vol} \leq 80\%, \quad (i)$$

where:
   $[\text{powders}]_{vol}$ is the volumetric mass proportion of the powders,
   $[CO_2(s)]_{vol}$ is the volumetric mass proportion of carbon dioxide in the solid form ($CO_2(s)$),
   b) setting the cryogenic suspension in motion to enable transport thereof,
   c) controlling the motion of the cryogenic suspension according to one or more parameter(s) (Co) related to the mixing and suspending step a).

2. The method according to claim 1, wherein it includes step a') of weighing the powders to be transported and step a") of weighing the carbon dioxide in the solid form ($CO_2(s)$), steps a') and a") being prior to the mixing and suspending step a).

3. The method according to claim 1, wherein step b) of setting the cryogenic suspension in motion comprises depressurising, pumping or pressurising the cryogenic suspension.

4. The method according to claim 1, wherein step c) of controlling the motion of the cryogenic suspension comprises step c') of acquiring and processing the measurement of the stirring torque (Co) of the cryogenic suspension.

5. The method according to claim 1, wherein step c) of controlling the motion of the cryogenic suspension comprises step c") of measuring the pressure and/or the opening of a pump performed during step b) of setting the cryogenic suspension in motion.

6. The method according to claim 1, wherein step b) of setting the cryogenic suspension in motion is followed by a transport step d) and a phase separation step e) to obtain transported powders (Pt) and the implementing of a step f) for recycling the cryogenic fluid.

7. The method according to claim 1, wherein the average diameter of the particle size of the carbon dioxide in the solid form ($CO_2(s)$) is comprised between 0.1 and 10 times that of the particle size of the powders to be transported.

8. The method according to claim 1, wherein the carbon dioxide charge level in the solid form ($CO_2(s)$) is comprised between 0.1 and 10 times that of the powders to be transported.

9. The method according to claim 1, wherein the viscosity of the cryogenic suspension as a function of the charge level and of the particle size of the constituent solid of this cryogenic suspension is expressed by the following equation (ii):

$$\mu/\mu_0 = (1 + \tfrac{1}{2} \cdot [N] \cdot \Phi/(1 - \Phi/\Phi_m)^2, \quad (ii)$$

where:
$\mu$ is the viscosity of the cryogenic suspension;
$\mu_0$ is the viscosity of the liquid phase;
$[N]$ is a constant;
$\Phi$ is the volume of solid in the volume of the cryogenic suspension;
$\Phi_m$ is the maximum volume of solid in the volume of the cryogenic suspension.

10. A device for transporting non-flowable powders, for the implementation of the method according to claim 1, including:
a system for mixing and suspending powders, carbon dioxide in the solid form ($CO_2(s)$) and cryogenic fluid to form the cryogenic suspension,
a system for setting the cryogenic suspension in motion,
a system for controlling the motion of the cryogenic suspension,
wherein the mixing and suspending system comprises:
a mixing tank,
a mixing and blending device, located inside the mixing tank,
means for the controlled introduction of the powders to be transported and of carbon dioxide in the solid form ($CO_2(s)$) into the mixing tank,
a means for measuring the level of the formed cryogenic suspension, located at least partially inside the mixing tank.

11. The device according to claim 10, wherein the system for setting the cryogenic suspension in motion comprises a pressure difference transport device.

12. The device according to claim 11, wherein the pressure difference transport device comprises means for pressurising, pumping or depressurising the cryogenic suspension.

* * * * *